April 25, 1967     B. E. WAGNER     3,315,401
SUPPORT FOR FISH-BITE DETECTING DEVICE
Filed May 20, 1965
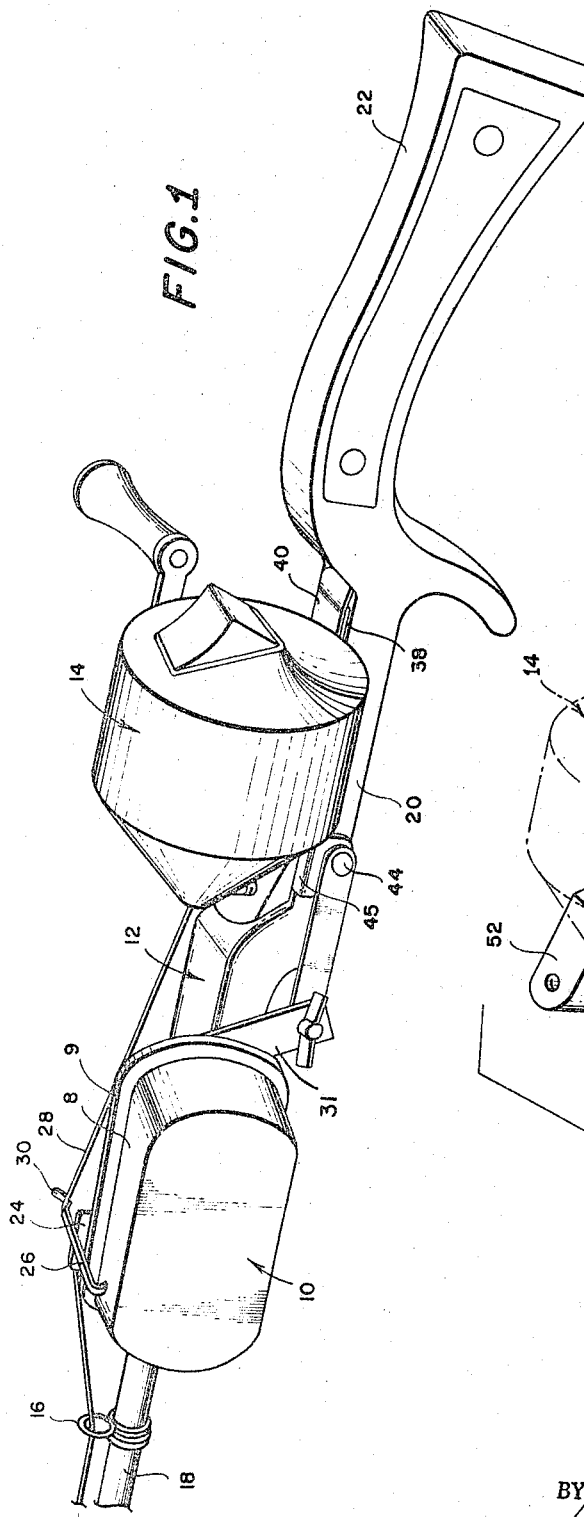
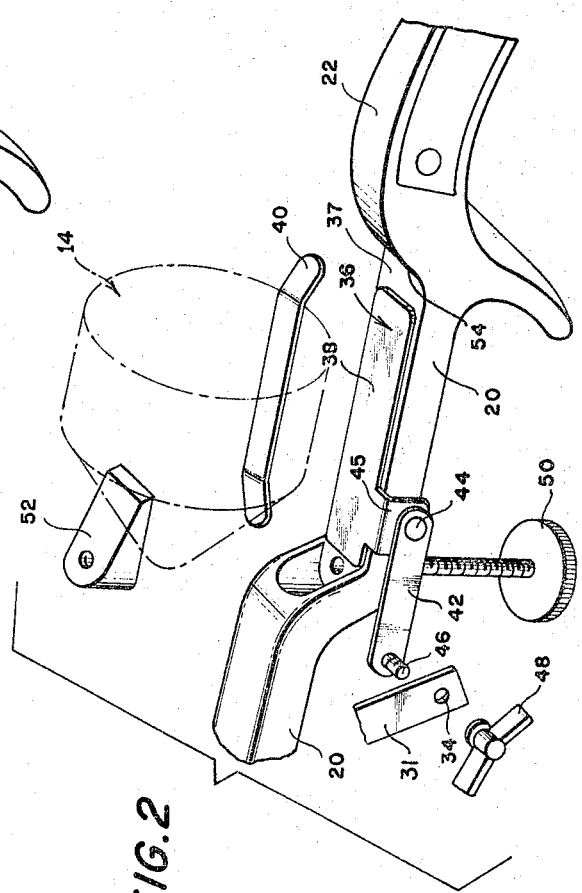
INVENTOR
BURTON E. WAGNER
BY *Semmes & Semmes*
ATTORNEYS

United States Patent Office 3,315,401
Patented Apr. 25, 1967

3,315,401
SUPPORT FOR FISH-BITE DETECTING DEVICE
Burton E. Wagner, 350 W. Crocker St.,
Fostoria, Ohio 44830
Filed May 20, 1965, Ser. No. 457,415
2 Claims. (Cl. 43—25)

The present application is a continuation-in-part of application Ser. No. 430,390, filed Feb. 4, 1965, and entitled Method and Apparatus for Detecting Fish-Bite, now Patent No. 3,283,438, granted Nov. 8, 1966.

The present invention relates generally to an apparatus for detecting fish-bite and particularly to a novel attachment assembly for supporting the signalling device upon conventional fishing rods.

In application Ser. No. 430,390, a signalling device is disclosed which produces an audible signal upon detecting fish-bite while regulating the sensitivity of the fishing line upon the signal producing mechanism. Although the signalling device of application Ser. No. 430,390 is entirely self-contained and adapted to be attached to any type of fishing rod, the present invention is believed to constitute an important advancement in this field as provision is made for equipping conventional rods with signalling devices without the necessity of time consuming and expensive modification of the structure of the rod such as by boring "mounting" holes, for example.

Accordingly, an object of the present invention is to provide a simple attachment assembly capable of supporting a fish-bite signalling device upon a fishing rod.

Still another object of the present invention is to provide a simple attachment assembly for supporting a fish-bite signalling device on any type of fishing rod without modifying the structure of same.

Still a further object of the present invention is to provide a simple support for a fish-bite signalling device which may be attached to any type of fishing rod without altering the fishing rod.

Yet, additional objects of the present invention will become apparent from the ensuing specification and attached drawing wherein:

FIG. 1 is a perspective view of a conventional fishing rod having a fish-bite signalling device attached thereto with the use of the novel supporting assembly constituting the subject matter of the present invention; and FIG. 2 is an exploded perspective view illustrating the positioning of the subject fish-bite supporting assembly between the rod and reel of a conventional fishing rod.

Referring now to FIG. 1, the fish-bite signalling device of application Ser. No. 430,390 is generally designated by the reference numeral 10 and, as shown, is removably attached to fishing pole 12 at a point intermediate reel 14 and the nearest line guide loop 16. Fishing pole 12 includes flexible rod portion 18 which is secured to the forward end of mounting section 20 which is provided with hand grip section 22.

The signalling device 10 includes a side cover 8 and a side base 9. Attached to side base 9 and projecting upwardly therefrom is a contact member or arm 24, the uppermost surface thereof disposed immediately beneath the undersurface of a resilient actuating arm 26 which normally is in spaced apart relationship therewith. Whenever line 28 is disposed within cradle 30 of arm 26 and the included angle formed by line 28 passing therethrough is less than 180°, sufficient force or resistance applied to line 28 will cause actuating arm 26 to be pulled downwardly into engagement with the top of contact arm 24. This contact functions as a switch for closing an electrical circuit within signalling device 10 which may be adapted to actuate any type of suitable signalling system such as the buzzer disclosed in application Ser. No. 430,390.

As seen in FIG. 1, a mounting arm 31 is attached to side base 9 in rotating relationship about a pin (not shown) so as to permit radial adjustment of signalling device 10. The lower end of arm 31 is provided with opening 34 enabling attachment of same to the novel supporting assembly constituting the subject matter of the present invention as described in detail hereinafter.

Supporting assembly 36 consists of a first stamped member 38 having a bottom surface designed to rest in abutting relationship against the mating top surface 37 of mounting section 20 and a top surface engaged by the base plate 40 of reel 14. A second stamped member 42 is rigidly attached to an integral flange 45 of the first member 38 by any conventional fastening means 44. Member 42 also includes threaded member 46 to which bolt 48 secures arm 31 and member 42 in selectively fixed relationship.

The ease of attaching signalling device 10 to mounting section 20 may be easily envisioned by studying FIG. 2. With the use of supporting assembly 36, it is only necessary to unloosen screw assembly 50 permitting the removal of reel 14 and locking member 52. Thereafter, member 38 of supporting assembly 36 is placed upon the top surface 37 of mounting section 20 and base plate 40 of reel 14 replaced under shoulder 54 of grip section 22 and locked member 52. Finally, screw assembly 50 is tightened within locking member 52 after which mounting arm 31 of signalling device 10 is attached to member 42 by screwing bolt 48 upon threaded member 46. Although mounting arm 31 of signalling device 10 may be set at any angle with respect to supporting assembly 36 with fastening bolt 48, subsequent angular variation may be achieved by rotating signalling device 10 about the pin (not shown) connecting arm 31 and base 9 of signalling device 10.

Manifestly, still further modification of the subject supporting assembly may be employed without departing from the scope of invention, as defined by the subjoined claims.

I claim:
1. An attachment for securing a fish-bite signalling device to a conventional fishing rod and reel, comprising:
 (A) a first portion inserted between the rod and reel together with first means fixing said first portion therebetween in locking relationship;
 (B) a second portion extending generally transversely of said first portion;
 (C) second means adjustably securing said second portion to said first portion such that said second portion may rotate with respect to said first portion, when desired; and
 (D) third means mounting the signalling device upon said second portion.
2. An attachment as in claim 1, wherein said second means constitutes a bolting assembly.

References Cited by the Examiner
UNITED STATES PATENTS

| | | |
|---|---|---|
| 1,266,367 | 5/1918 | Wilson. |
| 2,446,427 | 8/1948 | Linder _____ 43—17 |
| 2,619,559 | 11/1952 | Schenkel _____ 43—17 X |

FOREIGN PATENTS 637,843  5/1950  Great Britain.

SAMUEL KOREN, *Primary Examiner.*
D. J. LEACH, *Assistant Examiner.*